United States Patent
Düren et al.

(10) Patent No.: US 6,925,419 B2
(45) Date of Patent: Aug. 2, 2005

(54) INTRINSICALLY SAFE FIELD MAINTENANCE TOOL WITH REMOVABLE BATTERY PACK

(75) Inventors: Joachim Düren, Köln (DE); Günter Kämper, Castrop-Rauxel (DE); Brad N. Mathiowetz, Lakeville, MN (US)

(73) Assignees: Fisher-Rosemount Systems, Inc., Austin, TX (US); R. Stahl Schaltgerate GmbH, Waldenberg (DE)

( * ) Notice: Subject to any disclaimer, the term of this patent is extended or adjusted under 35 U.S.C. 154(b) by 57 days.

(21) Appl. No.: 10/440,048

(22) Filed: May 16, 2003

(65) Prior Publication Data
US 2004/0230401 A1 Nov. 18, 2004

(51) Int. Cl.$^7$ ................................................. G06F 11/30
(52) U.S. Cl. ........................... 702/184; 702/6; 702/183; 702/188
(58) Field of Search ............................. 702/6, 188, 184, 702/183; 701/23; 700/9, 51; 370/241

(56) References Cited

U.S. PATENT DOCUMENTS

| | | | |
|---|---|---|---|
| 3,774,693 A | 11/1973 | Orthman | 172/311 |
| 3,955,132 A | * 5/1976 | Greenwood | 323/231 |
| 4,290,647 A | 9/1981 | Hensel et al. | 297/362 |
| 4,337,516 A | 6/1982 | Murphy et al. | 364/551 |
| 4,535,636 A | 8/1985 | Blackburn et al. | 73/831 |
| 4,630,265 A | 12/1986 | Sexton | 370/86 |
| 4,630,483 A | 12/1986 | Engdahl | 73/652 |
| 4,635,214 A | 1/1987 | Kasai et al. | 364/551 |
| 4,707,796 A | 11/1987 | Calabro et al. | 364/552 |
| 4,954,923 A | 9/1990 | Hoeflich et al. | 361/111 |
| 4,964,125 A | 10/1990 | Kim | 371/15.1 |
| 4,988,990 A | 1/1991 | Warrior | 340/25.5 |
| 5,005,142 A | 4/1991 | Lipchak et al. | 364/550 |
| 5,099,539 A | 3/1992 | Forester | 15/143 B |

(Continued)

FOREIGN PATENT DOCUMENTS

| | | |
|---|---|---|
| DE | 29917651 | 12/2000 |
| DE | 1993 0660 A1 | 1/2001 |
| EP | 0 633 420 A | 1/1995 |
| EP | 0676 818 B | 10/1995 |
| EP | 1022626 A2 | 7/2000 |
| GB | 1 387 619 A | 3/1975 |
| GB | 2347232 | 8/2000 |
| JP | 2753592 | 1/1990 |
| WO | WO/96/12993 | 5/1996 |
| WO | WO/97/21157 | 6/1997 |
| WO | WO/98/39718 | 9/1998 |
| WO | WO/00/41050 | 7/2000 |
| WO | WO 00/55700 | 9/2000 |
| WO | WO/02/027418 | 4/2002 |

OTHER PUBLICATIONS

Dewey, Fieldbus Device maintenance—Do I Need to Go to the Field Anymore?, The Instrumentation, System and Automation Society, ISA 2000.

SImo et al., Field Devices—Models and their Realizations, Dec. 11–14, 2002, Industrial Technology, IEEE ICIT 2002, IEEE International Conference, vol. 1, pp. 307–312.

(Continued)

Primary Examiner—John Barlow
Assistant Examiner—Stephen J. Cherry
(74) Attorney, Agent, or Firm—Westman, Champlin & Kelly, P.A.

(57) ABSTRACT

An intrinsically safe field maintenance tool includes terminals selectably coupleable to a process communication loop having a process industry standard communication protocol. At least one media is configured to communicate in accordance with a process industry standard communication protocol. A battery pack connector is adapted to removably couple to an intrinsically safe removable battery pack and provide power to circuitry in intrinsically safe field maintenance tool. An intrinsically safe battery pack is also provided.

17 Claims, 7 Drawing Sheets

U.S. PATENT DOCUMENTS

| | | | |
|---|---|---|---|
| 5,103,409 A | 4/1992 | Shimizu et al. | 364/556 |
| 5,113,303 A | 5/1992 | Herres | 361/45 |
| 5,148,378 A | 9/1992 | Shibayama et al. | 364/571.07 |
| 5,150,289 A | 9/1992 | Badavas | 364/154 |
| 5,197,328 A | 3/1993 | Fitzgerald | 73/168 |
| 5,426,774 A | 6/1995 | Banerjee et al. | 395/575 |
| 5,434,774 A | 7/1995 | Seberger | 364/172 |
| 5,442,639 A | 8/1995 | Crowder et al. | 371/20.1 |
| 5,469,156 A | 11/1995 | Kogure | 340/870.38 |
| 5,481,200 A | 1/1996 | Voegele et al. | 324/718 |
| 5,501,107 A | 3/1996 | Snyder et al. | 73/862.23 |
| 5,570,300 A | 10/1996 | Henry et al. | 364/551.01 |
| 5,573,032 A | 11/1996 | Lenz et al. | 137/486 |
| 5,581,033 A | 12/1996 | Hess | 73/431 |
| 5,598,521 A | 1/1997 | Kilgore et al. | 395/326 |
| 5,623,605 A | 4/1997 | Keshav et al. | 395/200.17 |
| 5,665,899 A | 9/1997 | Willcox | 73/1.63 |
| 5,697,453 A | 12/1997 | Van Den Bosch | 172/41 |
| 5,742,845 A | 4/1998 | Wagner | 395/831 |
| 5,752,249 A | 5/1998 | Macon, Jr. et al. | 707/103 |
| 5,764,891 A | 6/1998 | Warrior | 395/200.2 |
| 5,828,567 A | 10/1998 | Eryurek et al. | 364/184 |
| 5,838,187 A | 11/1998 | Embree | 327/512 |
| 5,909,368 A | 6/1999 | Nixon et al. | 364/131 |
| 5,923,557 A | 7/1999 | Eidson | 364/471.03 |
| 5,940,290 A | 8/1999 | Dixon | 364/138 |
| 5,956,663 A | 9/1999 | Eryurek | 702/183 |
| 5,960,214 A | 9/1999 | Sharpe, Jr. et al. | 395/835 |
| 5,970,430 A | 10/1999 | Burns et al. | 702/122 |
| 5,980,078 A | 11/1999 | Krivoshein et al. | 364/131 |
| 5,995,916 A | 11/1999 | Nixon et al. | 702/182 |
| 6,017,143 A | 1/2000 | Eryurek et al. | 364/148.06 |
| 6,023,399 A | 2/2000 | Kogure | 364/23 |
| 6,026,352 A | 2/2000 | Burns et al. | 702/182 |
| 6,047,222 A | 4/2000 | Burns et al. | 700/79 |
| 6,052,655 A | 4/2000 | Kobayashi et al. | 702/184 |
| 6,091,968 A | 7/2000 | Koohgoli et al. | 455/557 |
| 6,094,600 A | 7/2000 | Sharpe, Jr. et al. | 700/19 |
| 6,111,738 A | 8/2000 | McGoogan | 361/91.5 |
| 6,119,047 A | 9/2000 | Eryurek et al. | 700/28 |
| 6,179,964 B1 | 1/2001 | Begemann et al. | 162/198 |
| 6,192,281 B1 | 2/2001 | Brown et al. | 700/2 |
| 6,195,591 B1 | 2/2001 | Nixon et al. | 700/83 |
| 6,211,623 B1 | 4/2001 | Wilhelm et al. | 315/224 |
| 6,236,334 B1 | 5/2001 | Tapperson et al. | 340/825.37 |
| 6,263,487 B1 | 7/2001 | Stripf et al. | 717/1 |
| 6,270,920 B1 | 8/2001 | Nakanishi et al. | 429/163 |
| 6,298,377 B1 | 10/2001 | Hartkainen et al. | 709/223 |
| 6,304,934 B1 | 10/2001 | Pimenta et al. | 710/129 |
| 6,307,483 B1 | 10/2001 | Westfield et al. | 340/870.11 |
| 6,309,986 B1 | 10/2001 | Flashinski | 442/125 |
| 6,317,701 B1 | 11/2001 | Pyotsia et al. | 702/188 |
| 6,324,607 B1 | 11/2001 | Korowitz et al. | 710/102 |
| 6,356,191 B1 | 3/2002 | Kirkpatrick et al. | 340/501 |
| 6,370,448 B1 | 4/2002 | Eryurek | 700/282 |
| 6,377,859 B1 | 4/2002 | Brown et al. | 700/79 |
| 6,397,114 B1 | 5/2002 | Eryurek et al. | 700/51 |
| 6,434,504 B1 | 8/2002 | Eryurek et al. | 702/130 |
| 6,444,350 B1 | 9/2002 | Toya et al. | 429/90 |
| 6,449,574 B1 | 9/2002 | Eryurek et al. | 702/99 |
| 6,473,710 B1 | 10/2002 | Eryurek | 702/133 |
| 6,487,462 B1 | 11/2002 | Reeves | 700/73 |
| 6,505,517 B1 | 1/2003 | Eryurek et al. | 73/861.08 |
| 6,519,546 B1 | 2/2003 | Eryurek et al. | 702/130 |
| 6,532,392 B1 | 3/2003 | Eryurek et al. | 700/54 |
| 6,539,267 B1 | 3/2003 | Eryurek et al. | 700/51 |
| 6,594,603 B1 | 7/2003 | Eryurek et al. | 702/104 |
| 6,594,621 B1 | 7/2003 | Meeker | 702/185 |
| 6,598,828 B2 | 7/2003 | Fiebick et al. | 244/118.1 |
| 6,601,005 B1 | 7/2003 | Eryurek et al. | 702/104 |
| 6,611,775 B1 | 8/2003 | Coursolle et al. | 702/65 |
| 6,615,149 B1 | 9/2003 | Wehrs | 702/76 |
| 6,629,059 B2 | 9/2003 | Borgeson et al. | 702/183 |
| 6,654,697 B1 | 11/2003 | Eryurek et al. | 702/47 |
| 6,697,681 B1 | 2/2004 | Stoddard et al. | 700/17 |
| 6,748,631 B2 | 6/2004 | Iguchi et al. | 24/265 WS |
| 6,775,271 B1 | 8/2004 | Johnson et al. | 370/352 |
| 2001/0053065 A1 | 12/2001 | Cudini et al. | 361/728 |
| 2002/0004370 A1 | 1/2002 | Stengele et al. | |
| 2002/0065631 A1 | 5/2002 | Loechner | |
| 2002/0077711 A1 | 6/2002 | Nixon et al. | |
| 2002/0123864 A1 | 9/2002 | Eryurek et al. | |
| 2003/0023408 A1 | 1/2003 | Wight et al. | |
| 2003/0023795 A1 | 1/2003 | Packwood et al. | |
| 2003/0033040 A1 | 2/2003 | Billings | 700/97 |
| 2003/0158795 A1 | 8/2003 | Markham et al. | |

OTHER PUBLICATIONS

U.S. Appl. No. 09/384,876, filed Aug. 27, 1999, Eryurek et al.

U.S. Appl. No. 09/409,098, filed Sep. 30, 1999, Eryurek et al.

U.S. Appl. No. 09/799,824, filed Mar. 5, 2001, Rome et al.

U.S. Appl. No. 09/852,102, filed May 9, 2001, Eryurek et al.

U.S. Appl. No. 09/855,179, filed May 14, 2001, Eryurek et al.

U.S. Appl. No. 10/790,627, filed Mar. 6, 2003, Mathiowetz.

U.S. Appl. No. 10/438,386, filed Mar. 1, 2004, Mathiowetz et al.

U.S. Appl. No. 10/440,047, filed May 16, 2003, Kantzes et al.

U.S. Appl. No. 10/426,894, filed Apr. 30, 2003, Duren et al.

U.S. Appl. No. 10/438,401, filed May 16, 2003, Opheim et al.

U.S. Appl. No. 10/440,434, filed May 16, 2003, DelaCruz et al.

U.S. Appl. No. 10/435,819, filed May 12, 2003, Kantzes et al.

U.S. Appl. No. 10/440,048, filed May 16, 2003, Duren et al.

U.S. Appl. No. 10/440,444, filed May 16, 2003, Mathiowetz et al.

U.S. Appl. No. 10/439,660, filed May 16, 2003, Mathiowetz et al.

U.S. Appl. No. 10/439,764, filed May 16, 2003, Mathiowetz.

U.S. Appl. No. 10/310,703, filed Dec. 5, 2002, Zielinski et al.

U.S. Appl. No. 10/440,041, May 16, 2003, Mathiowetz et al.

U.S. Appl. No. 10/440,441, filed May 16, 2003, Mathiowetz et al.

"Fluke 179 Multimeter & ToolPak Combo Pack," http://www.fluke.com/Multimeter/Toolpak.ASP?AGID=6&SID=260 (2 pages).

"Multifunctions PDA Calibrator Transmation Model 3–PMF1," Transmation, Apr. 2001.

"AAPA 60 & 90 Series Multimeter," http://www.appatech.com/a-60new.htm (5 pages).

"Fieldbus Standard for Use in Industrial Control Systems Part 2: Physical Layer Specification and Service Definition", ISA–S50.02–1992, pp. 1–93.

Hart Communications, Technical Information, Part 4 Communications, Samson, Frankfurt.

"Fieldbus Brings Protocol to Process Control," Santori et al., IEEE Spectrum, vol. 33, Issue 3, Mar. 1996, pps. 60–64.

"Computerized Maintenance systems—an Overview of Two Basic Types for Field Devices," Medlin, IEEE Pulp and Pater Industry Technical Conference, Jun. 21–25, 1999, pps. 230–232.

"Fieldbus in the Process Control Laboratory—its Time has Come," Rehg. et al., ASEE/IEEE Frontiers in Education Conference, vol. 3, Nov. 1999, pps. 13B4/12–13B4/17.

"Generic Device Description for Complex HART Field Devices," Zulkifi et al., IEE 8$^{th}$ International Conference on Communication Systems, vol. 2, Nov. 25–28, 2002, pps. 646–650.

"SFC Smart Field Communicator–Model STS103," Honeywell, Specification, Dec. 1995, pps. 1–4.

"SFC Smart Field Communicator–Models SFC160/SFC260," Yamatake, Specification Apr. 1999, pps. 1–6.

"HART Communicator," Fisher–Rosemount, Product Manual, Jul. 2000, pps. i–iv, ix–x, 1–1–1–40–2–1–2–8–3–1–3–38–A–1–A–6–B–1–B–6 C–1–C–4–D–1–D–4 and I–1 1–2.

Shoji et al., Fieldbus System Engineering, 1999, Yokogawa Technical Report.

Diedrich et al., Field Device Integration in DCS Engineering Using a Device Model, 1998, IEEE.

\* cited by examiner

INTRINSICALLY SAFE FIELD MAINTENANCE TOOL WITH REMOVABLE BATTERY PACK

BACKGROUND OF THE INVENTION

Intrinsically safe field maintenance tools are known. Such tools are highly useful in the process control and measurement industry to allow operators to conveniently communicate with and/or interrogate field devices in a given process installation. Examples of such process installations include petroleum, pharmaceutical, chemical, pulp and other processing installations. In such installations, the process control and measurement network may include tens or even hundreds of various field devices which periodically require maintenance to ensure that such devices are functioning properly and/or calibrated. Moreover, when one or more errors in the process control and measurement installation is detected, the use of an intrinsically safe hand held field maintenance tool allows technicians to quickly diagnose such errors in the field.

One such device is sold under the trade designation Model 275 HART® Communicator available from Fisher-Rosemount Systems, Inc., of Eden Prairie, Minn. HART® is a registered trademark of the HART® Communication Foundation. The Model 275 provides a host of important functions and capabilities and generally allows highly effective field maintenance. However, the Model 275 does not currently support communication with non-HART® (Highway Addressable Remote Transducer) devices.

The HART® protocol has a hybrid physical layer consisting of digital communication signals superimposed on the standard 4–20 mA analog signal. The data transmission rate is approximately 1.2 Kbits/SEC. HART® communication is one of the primary communication protocols in process industries.

Another major process industry communication protocol is known as the FOUNDATION™ fieldbus communication protocol. This protocol is based on an ISA standard (ISA-S50.01-1992, promulgated by the Instrument Society of America in 1992). A practical implementation was specified by the Fieldbus Foundation (FF). FOUNDATIONT™ Fieldbus is an all-digital communication protocol with a transmission rate of approximately 31.25 Kbits/SEC.

SUMMARY OF THE INVENTION

An intrinsically safe field maintenance tool includes terminals selectably coupleable to a process communication loop having a process industry standard communication protocol. At least one media access unit is coupled to the terminals. The media access unit is configured to communicate in accordance with a first process industry standard communication protocol. A processor couples to the at least one media access unit and a keypad coupled to the processor to receive user input. A display couples to the processor to display data. A battery pack connector is adapted to removably couple to a removable battery pack and provide power to circuitry in the intrinsically safe field maintenance tool.

DETAILED DESCRIPTION OF THE PREFERRED EMBODIMENTS

An improved intrinsically safe field maintenance tool in accordance with embodiments of the present invention is operable with at least two industry standard device descriptions. The tool includes at least two power islands which are electrically isolated in a manner to meet intrinsic safety requirements. In one specific embodiment, an improved intrinsically safe field maintenance tool implements both HART® and fieldbus Device Description Language (DDL). The improved field maintenance tool is used to maintain both two-wire and four-wire (i.e. external power) field devices using these protocols. Preferably, both configuration and calibration are supported via DDL technology. DDL technology is known and additional reading regarding Device Description Language can be found in U.S. Pat. No. 5,960,214 to Sharp, Jr. et al.

The improved intrinsically safe field maintenance tool also facilitates a convenient display of diagnostic information from individual field devices (i.e. status bits) as well as providing advanced protocol-specific network troubleshooting features. Further details and benefits of the improved intrinsically safe field maintenance tool in accordance with embodiments of the present invention will be appreciated after reading the description below.

Figure 1:
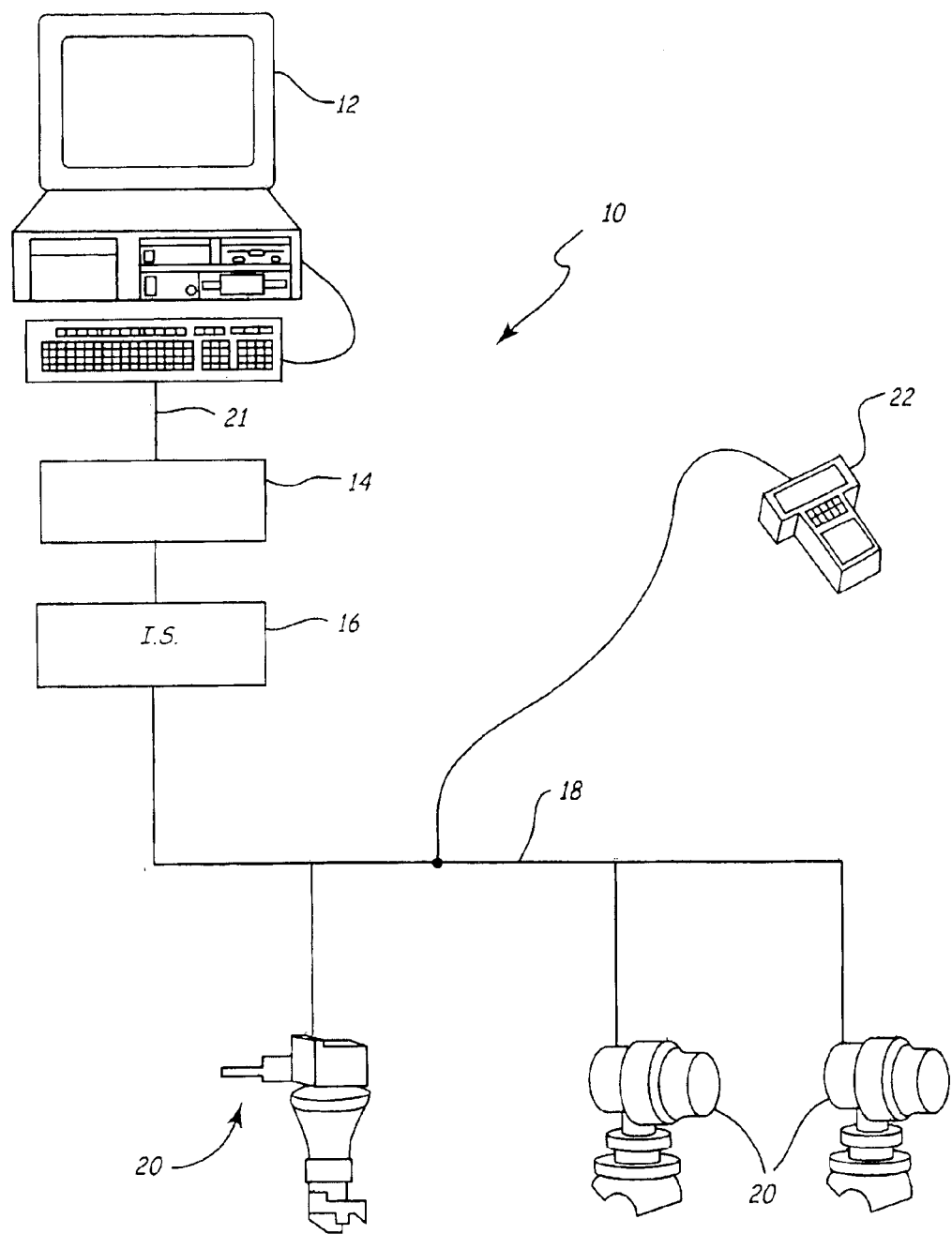
FIG. 1 illustrates a multidrop wiring configuration.

FIG. 1 illustrates an exemplary system in which embodiments of the present invention are useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication or process control loop 18 is a FOUNDATION™ fieldbus process communication loop and is coupled to field devices 20, which are shown coupled arranged in a multi-drop configuration. An alternative process communication loop (not shown) is an HART® process communication loop. FIG. 1 illustrates a multi-drop wiring configuration that vastly simplifies system wiring compared to other topologies such as the star topology. Multi-drop HART® configurations support a maximum of 15 devices, while multi-drop FOUNDATION™ Fieldbus configurations support a maximum of 32 devices.

Intrinsically safe field maintenance tool 22 is coupled to loop 18 as illustrated in FIG. 1. When coupled to a process control loop as shown, tool 22 can perform a number of the communication and diagnostic functions. Tool 22 can couple to and interact with HART® process communication loops in much the same way the presently available Model 275 HART® Communicator can.

Figure 2A:
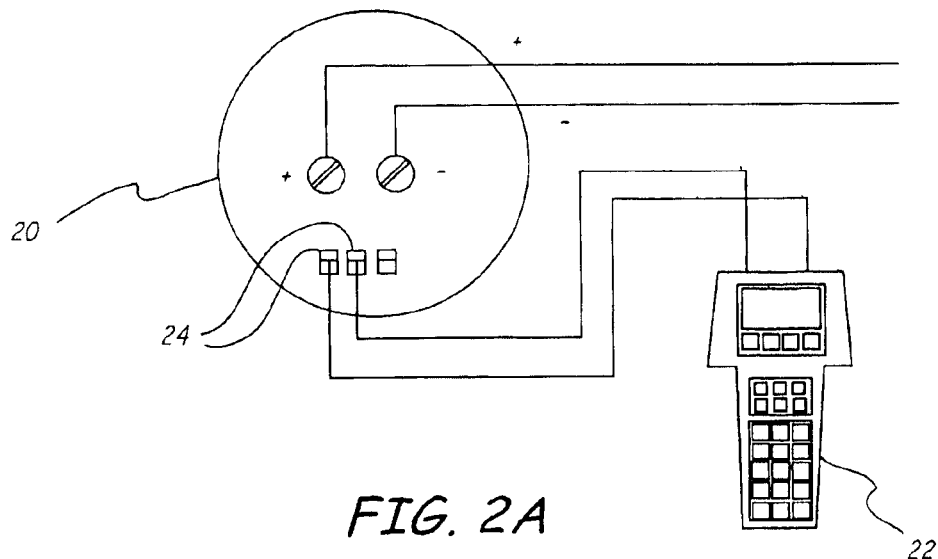
FIGS. 2A and 2B illustrate ways in which an intrinsically safe field maintenance tool may be connected to a process device.
Figure 2B:
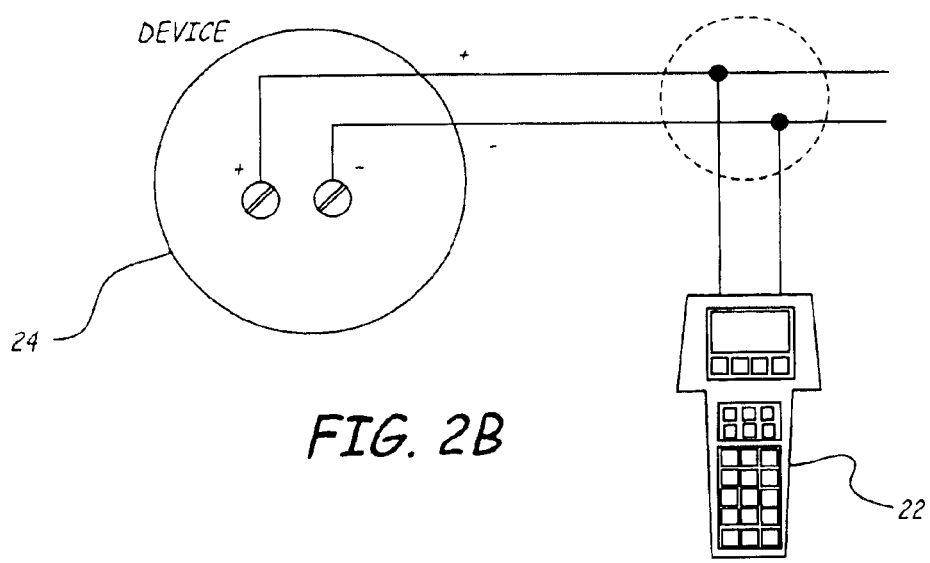

FIG. 2A illustrates tool 22 coupled to HART®-compatible device 20 via terminals 24. Alternately, tool 22 can communicate with a HART® compatible device on the process instrumentation communication loop, such as device 24 via the loop itself, as indicated in FIG. 2B.

Figure 3:
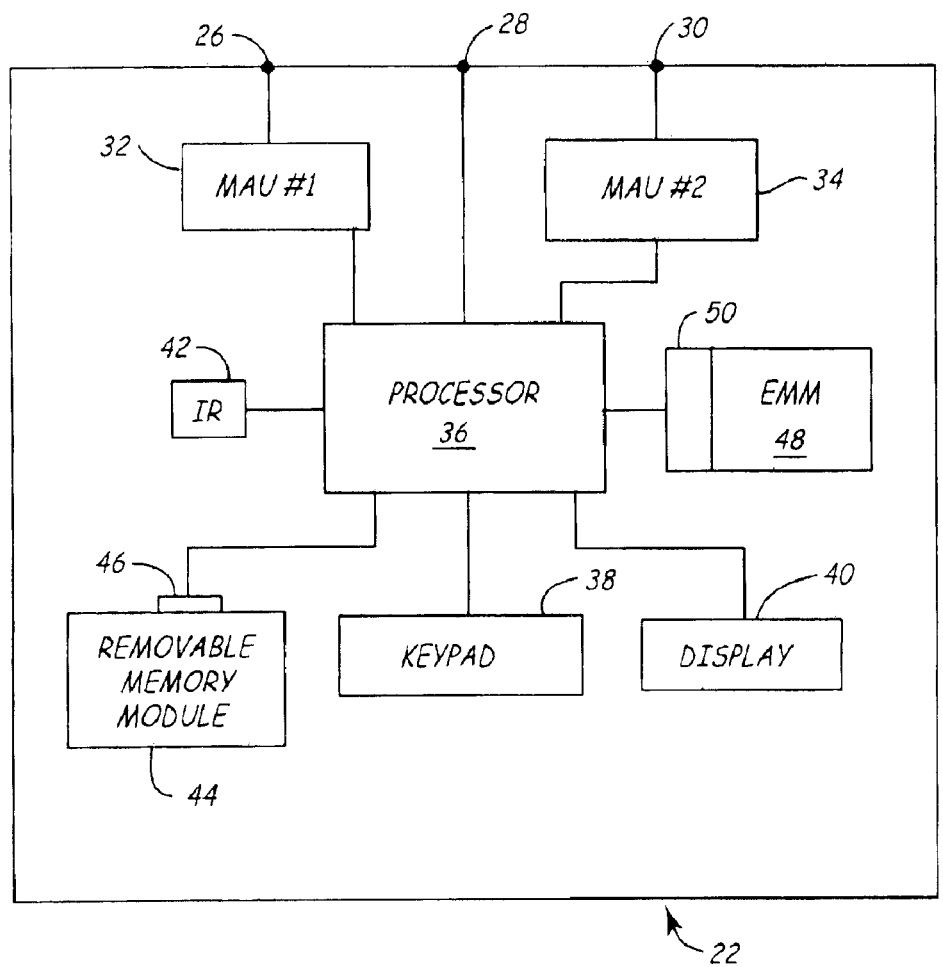
FIG. 3 is a diagrammatic view of field maintenance tool in accordance with an embodiment of the present invention.

FIG. 3 is a diagrammatic view of field maintenance tool 22 in accordance with embodiments of the present invention. As illustrated, tool 22 preferably includes three communication terminals 26, 28 and 30 which facilitate coupling tool 22 to process communication loops and/or devices in accordance with at least two process industry standard protocols. For example, when tool 22 is to be coupled to a loop of a first process industry standard protocol, such coupling is effected using terminal 26 and common terminal 28. Accordingly, the connection then is made via media access unit 32 which is configured to interact upon the process communication loop in accordance with the first industry standard protocol. Additionally, when tool 22 is to be coupled to a process and control measurement loop that operates in accordance with a second industry standard protocol, such connection is made via common terminal 28 and terminal 30. Thus, such a connection is effected via the second media access unit 34 which is configured to interact upon the process communication loop in accordance with the second industry standard protocol. Both media access units 32 and 34 are coupled to processor 36 which receives data from one of the media access units and interprets that data accordingly.

Processor 36 is also coupled to keypad module 38 and display module 40. Keypad module 38 is coupled to the keypad on the housing of tool 22 in order to receive various keypad inputs from a user. Display module 40 is coupled to the display to provide data and/or a user interface.

In accordance with various embodiments of the present invention, tool 22 includes additional hardware enhancements that facilitate increased functionality over that generally available in the prior art. In one embodiment, tool 22 includes infrared data access port 42 which is coupled to processor 36 to allow tool 22 to transfer information to and from a separate device using infrared wireless communication. One advantageous use of port 42 is for transferring and/or updating Device Descriptions stored in one or more memories of tool 22. A Device Description (DD) is a software technology used to describe parameters in a field device in a computer-readable format. This contains all of the information necessary for a software application being executed on processor 36 to retrieve and use the parametric data. The separate device such as computer 12, can obtain a new Device Description from floppy disk, CD ROM, or the internet and wirelessly transfer the new Device Description to tool 22.

Removable memory module 44 is removably coupled to processor 36 via port/interface 46. Removable memory module 44 is adapted to store software applications that can be executed instead of primary applications on processor 36. For example, module 44 may contain applications that use the HART® or FOUNDATIONT™ fieldbus communication port, to provide a comprehensive diagnostic for a given process valve. Additionally, module 44 may store software applications that aid in the calibration or configuration of specific devices. Module 44 may also store a software image for a new or updated primary device application that can subsequently be transferred into the non-volatile memory of device 36 to enable execution of the updated application. Further still, module 44 provides removable memory storage for the configuration of multiple devices allowing a field maintenance operator to acquire a relatively substantial amount of device data and conveniently store or transfer such data by simply removing module 44.

Preferably, module 44 is adapted to be replaceable in hazardous areas in a process plant. Thus, it is preferred that module 44 comply with intrinsic safety requirements set forth in: APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610, promulgated by Factory Mutual Research October, 1988. Adaptations to comply with additional industrial standards such as Canadian Standards Association (CSA) and the European CENELEC standards are also contemplated. Examples of specific structural adaptations for memory module 44 and/or interface 46 to facilitate compliance include energy limiting circuits such that the operating voltage level of memory module 44 is sufficiently low that stored energy within module 44 cannot generate a source of ignition. Additionally, module 44 may include current limiting circuitry to ensure that in the event that specific terminals on module 44 are shorted, that the discharge energy is sufficiently low that ignition is inhibited. Specific implementations of these features are set forth in connection with FIG. 4. Interface 44 may include physical characteristics that are specifically designed to prevent exposure of electrical contacts on memory module 44 to an external environment while simultaneously allowing suitable interface contacts to make electrical contact with module 44. For example, module 44 may include an overmodeling that can be pierced or otherwise displaced by coupling module 44 to interface 46.

Tool 22 also preferably includes expansion memory module 48 coupled to processor 36 via connector 50 which is preferably disposed on the main board of tool 22. Expansion memory module 48 may contain Device Descriptions of first and second industry standard protocols. Module 48 may also contain license code(s) that will determine the functionality of tool 22 with respect to the multiple protocols. For example, data residing within module 48 may indicate that tool 22 is only authorized to operate within a single process industry standard mode, such as the HART® protocol. Ultimately, a different setting of that data within module 48 may indicate that tool 22 is authorized to operate in accordance with two or more industry standard protocols. Module 48 is preferably inserted to a connector 50 on the main board and may in fact require partial disassembly of tool 22, such as removing the battery pack to access port 50.

Figure 4:
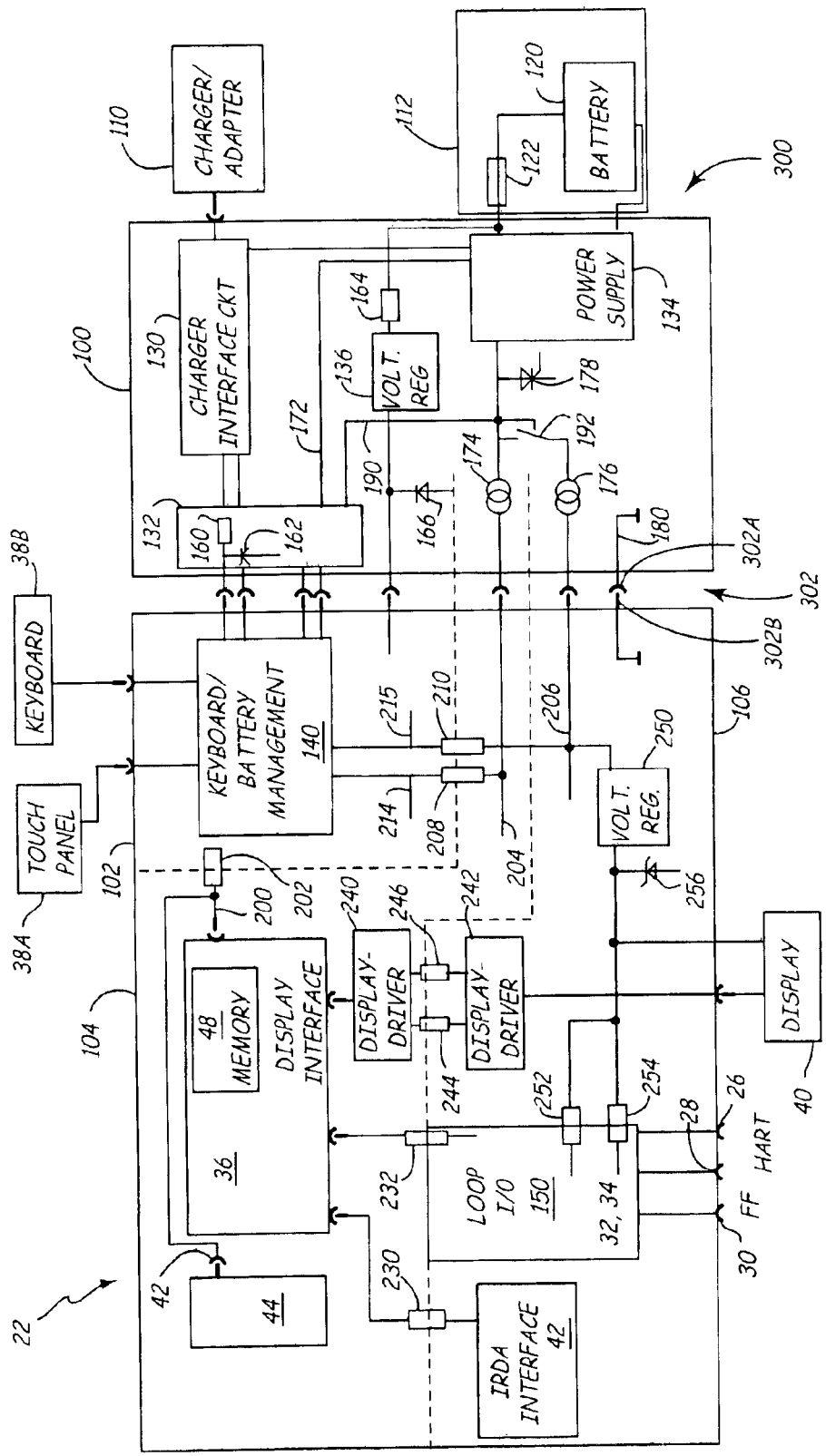
FIG. 4 is a more detailed block diagram of the intrinsically safe maintenance tool illustrated in FIGS. 2A, 2B and 3.

FIG. 4 is a more detailed block diagram of tool 22. Tool 22 generally includes power supply circuitry 100 and power islands 102, 104 and 106. The keypad 38 shown in FIG. 3 is divided into a touch panel 38A and a keyboard 38B in FIG. 4. A charger/adapter 110 couples to power supply circuitry 100 as does a battery module 112.

Power supply circuitry 100 provides power to power islands 102, 104 and 106 using power received from charger/adapter 110 or battery module 112. Battery module 112 includes batteries 120 which couple to power supply circuitry 100 through a fuse 122. Power supply circuitry 100 includes charger interface circuitry 130, isolator 132, power supply circuitry 134, and voltage regulator 136. Power island 102 includes keyboard and battery management circuitry 140. Power island 104 includes processor 136. Power island 106 includes loop I/O circuitry 150 which implements MAU 32 and MAU 34 shown in FIG. 3. The infrared interface 42 is also located in power island 106.

In the present invention, the power supply 100 and the power islands 102, 104 and 106 are isolated using passive and active techniques. Power supply 100 receives power from charger/adapter 110 or battery module 112. When charger/adapter 110 is used power supply 100 charges battery 120 or battery module 112. The power supply 100 is controlled by keyboard/battery management circuitry 140 and is isolated from circuitry 140 by isolator 132 which includes a plurality of resistors 160 and Zener diode 162. Resistors 160 act as passive current limiters and diode 162 act as passive voltage limiters. Power from battery module 112 is provided to power island 102 through voltage regulator 136 and resistor 164. A Zener diode 166 connects the power connection to ground. Connection 172 from power supply 134 provides a power on/off connection. Active current limiters 174 and 176 couple power supply 134 to power islands 104 and 106, respectively. SCR 178 limits the voltage applied to current limiters 174 and 176. An electrical ground connection 180 is also provided between power supply circuitry 100 and power islands 102, 104 and 106. A power on/off connection 190 selectively closes switch 192 to thereby provide power to power island 106.

Keyboard/battery management circuitry 140 couples to a touch pad panel 38A and a keyboard 38B and is configured to receive user input which is provided to processor 36 over connection 200 through a resistor 202. Circuitry 140 also couples to power connection 204 and 206 through resistors 208 and 210, respectively. These connections allow circuitry 140 to sense whether power is being supplied to power islands 104 and 106, respectively. Zener diodes 214 and 215 limit the voltage seen between the power islands.

Power island 104 includes processor 36 which couples to infrared interface 42 through resistor 230 and to loop I/O circuitry 150 through resistor 232. Processor 36 also couples to display 40 through power island 106 and display drivers 240 and 242 and resistors 244 and 246.

Loop I/O circuitry 150 of power island 106 receives power from a voltage regulator 250 through resistors 252 and 254. A Zener diode 256 limits the voltage applied to circuitry 150.

In order to meet intrinsic safety requirements, it is important that the surface temperature of small components under fault conditions be limited. Limiting component surface temperature will prevent ignition of surrounding material. For example, if the total surface area of a component is 20 mm$^2$, the power dissipation by the component must be limited to 1.3 watts. For systems with higher total power consumption, it is necessary to split the power between separate power islands. Using this power island technique, it is possible to exceed the 1.3 watt limit.

In the present invention, the power islands 102, 104 and 106 are supplied power through separate power connections which are connected to separate power supplies or through barriers. The power source for each power island is limited by voltage and current barriers to ensure that the maximum allowed power draw is not exceeded. Both passive barriers are used, such as a resistor current limiter and a Zener diode voltage limiter, as well as active limiters. For example, SCR 178 will close (short circuit) if the voltage exceeds a predetermined limit. Similarly, current limiters 174 and 176 activate SCR 178 if the current draw exceeds a predetermined limit. In both cases if the voltage or current exceeds the limits, SCR 178 will be activated and short circuit the power supply output.

In order to avoid energy transfers between the various islands 102, 104 and 106, sufficient physical space is provided between the islands. The distance is defined by the voltages on the island, the voltage differences and the particular intrinsic safety standard being met. Ground routes are also provided from the islands such that all of the islands are coupled to the same ground. The ground routes must be sufficient to carry the largest possible current. If the ground routes are fabricated as traces on a circuit board, the width of the trace must be sufficient to carry the desired current. Alternatively, a multi-layered trace can be provided.

Within each power island 102, 104 and 106, increased voltages can be generated using a DC to DC converter if the voltage required is greater than that provided by the power supply. For example, voltage regulator 250 can increase the voltage level provided from the power supply. The converter outputs are limited with voltage barriers which limit the maximum voltage applied. The greatest possible voltage value present in a particular island, along with the voltage of adjacent islands, defines the necessary spacing between the islands.

Various signal paths are provided between islands 102, 104 and 106 to allow signals to pass therebetween. Resistors are provided in the signal paths to limit the energy transfer. For the various signal paths, the following rules must be followed:

The maximum power transferred from one island to another through a signal path is maximum if the internal resistance of a particular island has the same value as the series resistor placed in the signal path. This yields the formula for maximum power $P_{max}=(I^2/R)/4$ where I is the current level and R is the series resistance value.

The maximum power calculation must be done for each island, and calculated in each direction through each signal path, in order to get the maximum power transfer into all of the islands via all of the signal paths.

A maximum power which an island is allowed to receive from the power supply must be such that the total power received is less than the desired maximum [i.e. 1.3 watts]. Thus, the maximum power allowed which an island is to receive to the power supply, plus the maximum power which an island may receive through all of the signal paths, must sum to less than 1.3 watts.

If the signal voltage between islands are different, the signal path must be blocked with barrier diodes.

A selection of the series resistors can effect the high frequency characteristics of the signal paths between islands. The resistance value together with the internal capacitance of the circuitry act as a high frequency filter. In order to reduce the capacitance due to the wiring, driver and level shifter circuits are preferably placed close to the series resistors an the island borders to thereby reduce the capacitance.

In some instances, very small components with a total component surface area of less than 20 mm$^2$ and the surface temperature limitation having a maximum value of 275° C., the limit may be exceeded for a particular power island even with the supplied power of 1.3 watts. In the present invention, a "subpower island" can be used to overcome this limitation. A subpower island is contained within a power island and is separated with a desired physical spacing. The same rules described above with respect to power islands are applied to the subpower island. Current limiting series resistors between the power island and the subpower island reduce the maximum possible power inside the subpower island. The maximum possible surface temperature of components inside the subpower island can be controlled by choosing the appropriate value of the current limiting series resistors. The signal paths between the power island and the subpower island thus reduce the power available within the subpower island. An example of subpower island is shown as loop I/O circuitry 150 in FIG. 4 which is a part of power island 106. Resistors 232, 252 and 254 limit the maximum power which may be supplied to the subpower island 150.

Figure 5:
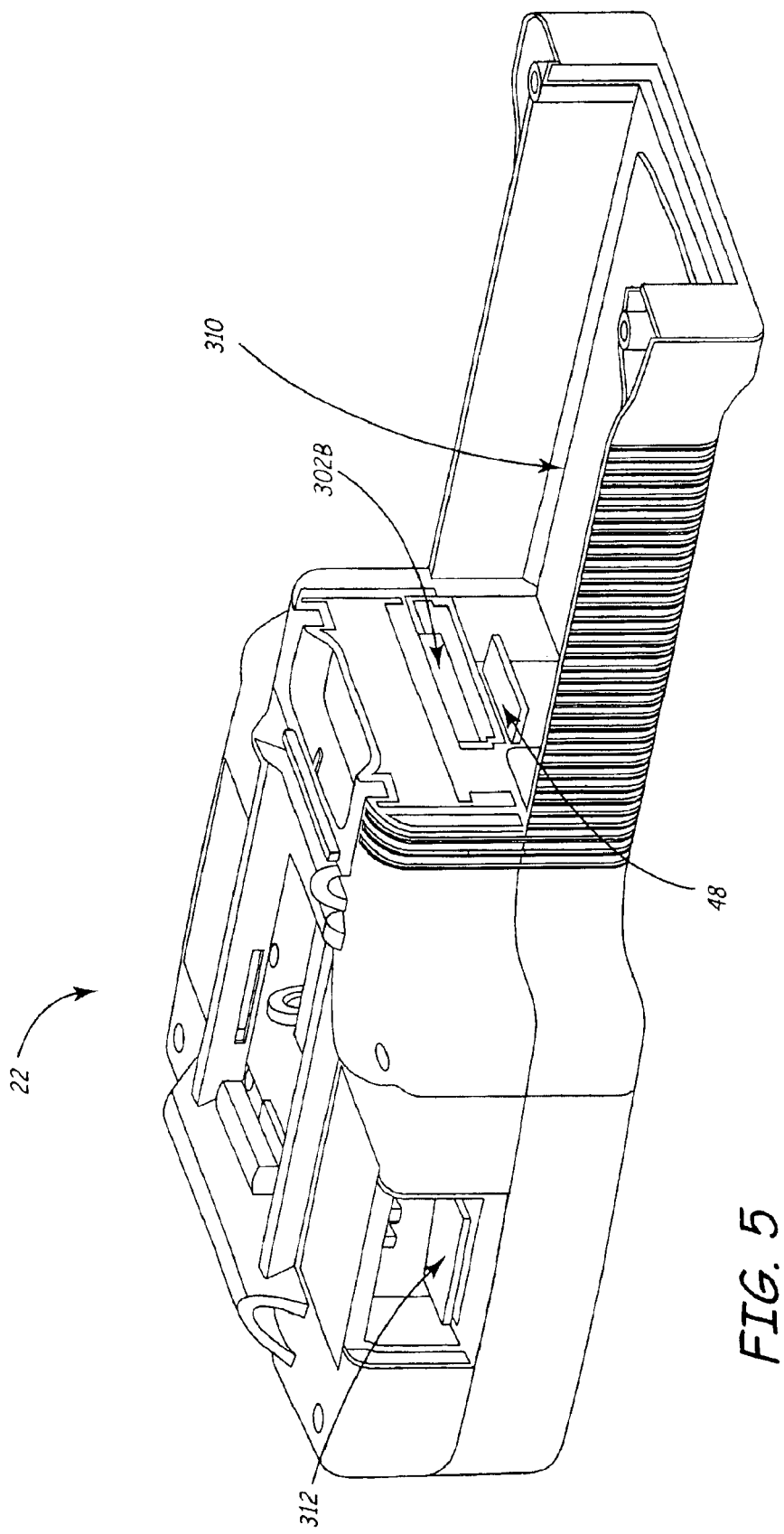
FIG. 5 is a bottom perspective view of the intrinsically safe field maintenance tool in which a removable battery pack is removed.

In one aspect, the present invention provides a removable battery pack for use with the tool 22. FIG. 5 is a perspective back view of tool 22 in which a battery pack 300 (not shown in FIG. 5) has been removed from tool 22. The battery pack 300 includes power supply 100 and battery module 112 shown in FIG. 4. The present invention provides a tool 22 which is battery powered and portable and is capable of being used in all areas of a process plant. In accordance with this aspect of the present invention, the battery pack 300 can be installed or removed even in hazardous areas of a process plant. The present invention provides a multi-pin connector 302 for coupling the battery module to the circuitry of tool 22 such that energy limiting configurations are provided between the components and the main unit. Connector 302 forms the connection between removable battery pack connectors 302A and tool body connectors 302B. Further, as discussed above, the power island each provide power limitation requirements to meet intrinsic safety (IS) standards.

When electrical circuitry is coupled to other electrical components, it is possible that an electrical spark can be generated. For example, a electrical energy can be stored in the various components which are connected to exposed metal pins used to make the connection. This stored electrical energy can discharge causing a spark. However, in accordance with intrinsic safety standards, sparks are unacceptable in a hazardous environment. The present invention provides electrical circuitry to limit any potential energy discharge such that there is not enough energy in such a discharge to ignite the potentially hazardous material in the environment.

Referring back to FIG. 4, the removable battery pack 300 couples to the electrical circuitry of tool 22 through connector 302.

As discussed above, circuitry 100 includes power supply 134 which provides a DC to DC converter which generates the primary supply voltage for the power islands 102, 104 and 106. The voltage provided by power supply 134 is limited to 3.7 volts. For example, if the voltage exceeds 3.7 volts, the SCR (thyristor) can be triggered to electrically short power supply 134. Similarly, if the current exceeds 330 mA, the SCR 178 can electrically short the output of power supply 134. The electrical connection between removable battery pack 300 and power module 102 uses passive circuitry to provide intrinsic safety. In this embodiment, a current limiting series resistor 160 and a voltage limiting Zener diode 162 are provided to limit the current and voltage, respectively, when applied to power island 102.

This configuration allows the removable battery pack 300 to meet intrinsic safety requirements such that it can be removed or applied in explosive environments. As the battery 102 has a relatively high energy density, it is necessary to use voltage and current limiting components and circuitry in the signal paths to the exposed, pins at connector 302A. This allows the connectors 302B and 302A to be connected together, or the pins on connectors 302A to be electrically shorted, without generating a spark. The circuitry must have selected maximum allowed values for the voltage, current, capacitance and inductance which appears at each of the exposed pins in the connector 302. In accordance with intrinsic safety standards, each voltage or current limiting component is preferably provided with triple redundancy such that even if two components fail, a third component remains functioning to prevent the undesired discharge.

Returning to the embodiment shown in FIG. 5, the battery pack 300 is configured to fit into depression 310 and plug into electrical connectors 302B. FIG. 5 also illustrates the expansion memory module 48 which is covered by the battery pack 300 when the battery pack 300 is inserted with the tool 22. The removable memory module 44 shown in FIG. 4 is inserted into receptacle 312 which is also shown in FIG. 5.

Figure 6:
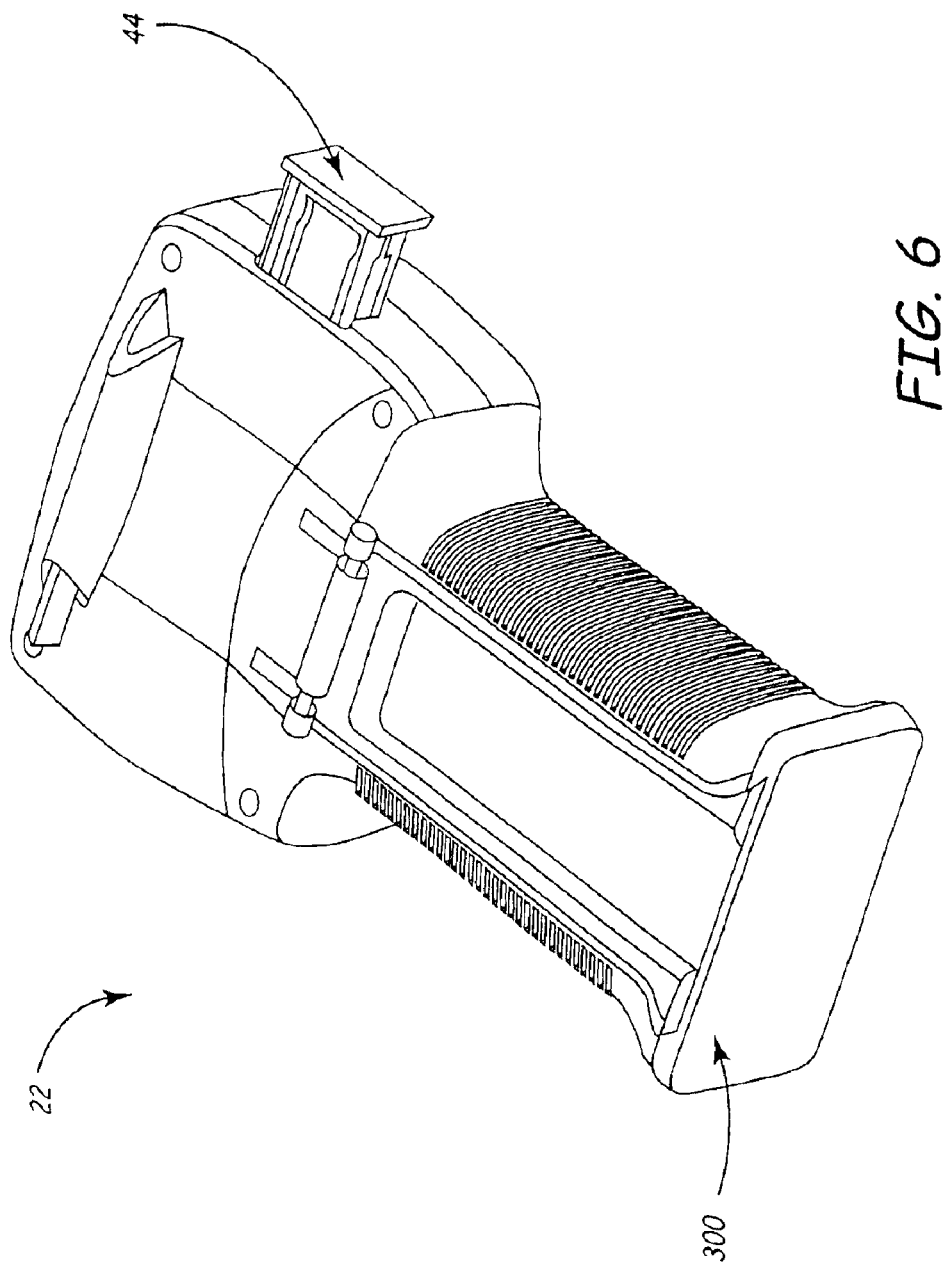
FIG. 6 is a bottom perspective view showing the intrinsically safe field maintenance tool including the removable battery pack.

FIG. 6 is a bottom plan view of tool 22 showing the removable battery pack 300 inserted with tool 22. FIG. 6 also shows the removable memory module 44 partially inserted into tool 22.

Figure 7B:
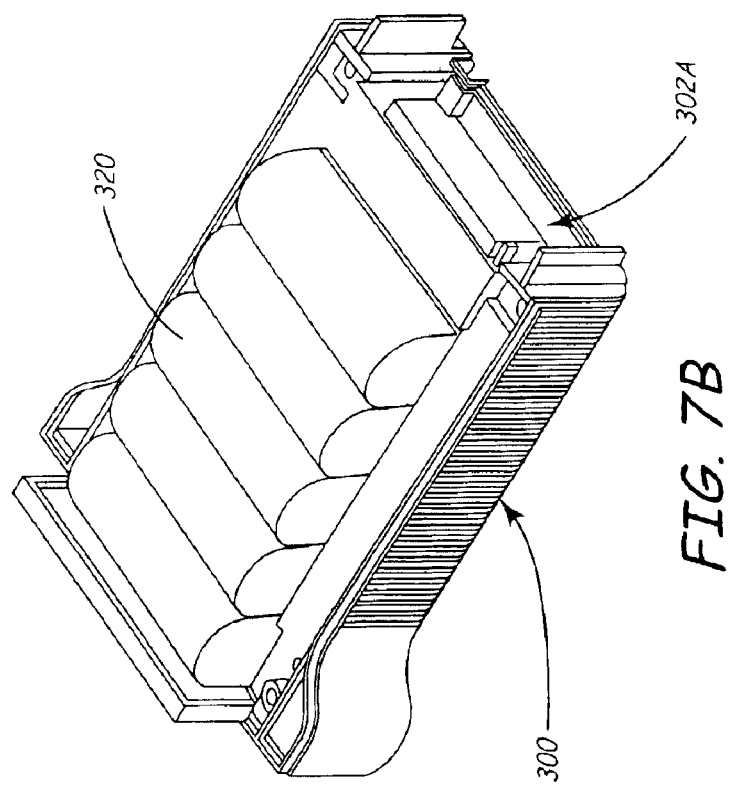
FIG. 7B is a top perspective view of the removable battery pack.
Figure 7A:
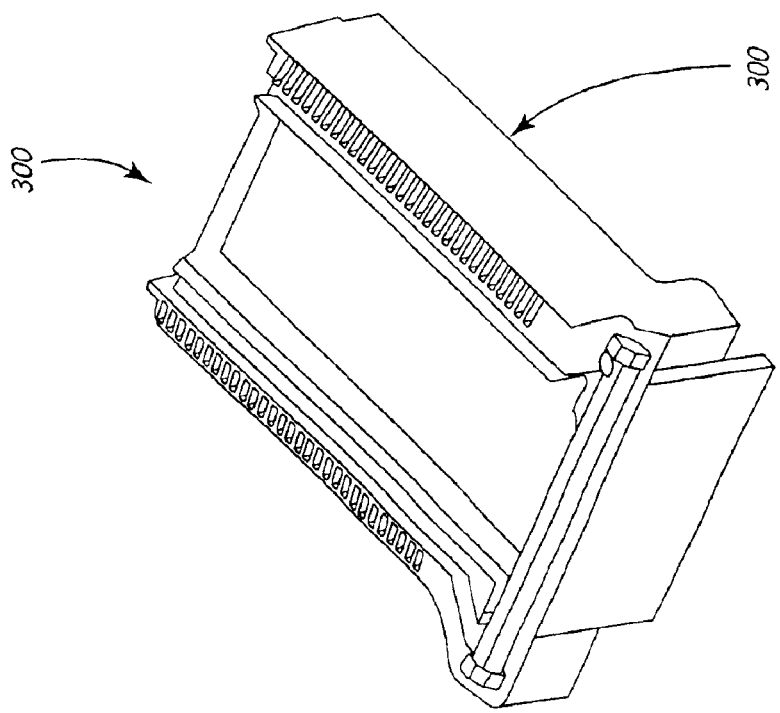
FIG. 7A is a bottom perspective view of the removable battery pack.

FIG. 7A is a bottom perspective view and FIG. 7B is a top perspective view of battery pack 300. The batteries 120 are carried in a battery compartment 320 which can be seen in FIG. 7B. FIG. 7B also shows the connectors 302A which are configured to plug into connectors 302B shown in FIG. 5.

During operation, circuitry within tool 22 such as keyboard/battery management circuitry 140, can monitor the state of charge of the battery 120. If the battery 120 of the removable battery pack 300 is approaching exhaustion, a warning can be provided, for example through display 40, to an operator. The battery pack 300 can be easily removed by the operator and replaced with a fully charged battery pack as desired. The intrinsic safety configuration allows the swapping of battery packs to be performed in hazardous environments.

Although the present invention has been described with reference to preferred embodiments, workers skilled in the art will recognize that changes may be made in form and detail without departing from the spirit and scope of the invention. The intrinsically safe battery pack 300 along with connectors 302A and 302B can be configured in accordance with the intrinsic safety standards discussed above. One example battery configuration is shown in U.S. Pat. Ser. No. 10/383,003, filed on Mar. 6, 2003, entitled "HEAT FLOW REGULATING COVER FOR AN ELECTRICAL STORAGE CELL" which is incorporated herein by reference.

What is claimed is:

1. An intrinsically safe field maintenance tool comprising:
   terminals selectably coupleable to a process communication loop having a process industry standard communication protocol;
   a first media access unit coupled to the terminals, wherein the first media access unit is configured to communicate in accordance with a first process industry standard communication protocol;
   a second media access unit coupled to the terminals, the second media access unit configured to communicate in accordance with a second process industry standard communication protocol
   a processor coupled to the first media access unit and the second media access unit;
   a keypad coupled to the processor to receive user input;
   a display coupled to the processor to display data; and
   a battery pack connector adapted to removeably couple to a removable battery pack and provide power to circuitry in the intrinsically safe field maintenance tool and provide power to circuitry in the intrinsically safe field maintenance tool.

2. The apparatus of claim 1 including a plurality of power islands and wherein the battery pack connector includes electrically isolated connections to at least two of the power islands.

3. The apparatus of claim 1 wherein the processor is configured to provide a output indicative of a condition of a battery in the battery pack.

4. The apparatus of claim 1 including a removable battery pack having a connector configured to couple to the battery pack connector.

5. The apparatus of claim 4 wherein the removable battery pack includes a battery.

6. The apparatus of claim 4 wherein the removable battery pack includes a current limiter.

7. The apparatus of claim 4 wherein the removable battery pack includes a DC to DC converter.

8. The apparatus of claim 4 wherein the removable battery pack includes electrical circuitry configured to provide an electrical short circuit to power supplied from the removable battery pack to the battery pack connector.

9. The apparatus of claim 8 wherein the electrical short circuit is triggered in response to a voltage exceeding a voltage threshold.

10. The apparatus of claim 8 wherein the electrical short circuit is triggered in response to a current exceeding a current threshold.

11. The apparatus of claim 4 wherein the removable battery pack including an electrical resistor configured to electrically couple the removable battery pack to the connector.

12. The apparatus of claim 4 wherein the removable battery pack including an electrical Zener diode configured to electrically couple the removable battery pack to the connector.

13. The apparatus of claim 4 including a connector configured to couple to a charger.

14. The apparatus of claim 13 the charger is configured to charge a battery of the battery pack.

15. The apparatus of claim 1 wherein circuitry in the removable battery pack is configured to reduce electrical arcing between pins of the connector.

16. The apparatus of claim 1 including a memory module connector configured to receive a removable memory module, wherein the removable memory module is enclosed within the intrinsically safe field maintenance tool when the removable battery pack is connected to the battery pack connector.

17. A removable battery pack configured to couple to an intrinsically safe field maintenance tool in accordance with claim 1.

* * * * *